United States Patent [19]

Hino et al.

[11] Patent Number: 5,204,569
[45] Date of Patent: Apr. 20, 1993

[54] ANISOTROPIC MAGNET FOR ROTARY ELECTRIC MACHINE

[75] Inventors: Haruyoshi Hino, Shizuoka; Takeshi Tanaka, Toyohashi, both of Japan

[73] Assignees: ASMO Co., Ltd.; Nippondenso Co., Ltd., both of Japan

[21] Appl. No.: 651,658

[22] Filed: Feb. 6, 1991

[30] Foreign Application Priority Data

Feb. 7, 1990 [JP] Japan ................................ 2-27976
Sep. 18, 1990 [JP] Japan ............................... 2-249467

[51] Int. Cl.[5] .......................................... H02K 1/18
[52] U.S. Cl. .................................... 310/154; 310/42; 310/258
[58] Field of Search ................ 310/51, 89, 42, 154, 310/49, 269, 156, 40 MM, 152, 258; 335/302

[56] References Cited

U.S. PATENT DOCUMENTS

| 1,014,622 | 1/1912 | Dinkins | 310/154 |
| 3,234,417 | 2/1966 | Somers | 310/154 |
| 3,440,464 | 4/1969 | Tolmie | 310/154 |
| 4,283,647 | 8/1981 | Herr | 310/154 |
| 4,703,210 | 10/1987 | Abukawa | 310/154 |
| 4,742,258 | 5/1988 | Earle | 310/154 |
| 4,757,220 | 7/1988 | Pouillange | 310/154 |
| 4,812,692 | 3/1989 | Arita | 310/154 |
| 5,034,641 | 7/1991 | Komuro | 310/154 |

FOREIGN PATENT DOCUMENTS

0008813  1/1979 Japan ................................ 310/154
63-260118 10/1988 Japan .
57-10729  1/1992 Japan .

Primary Examiner—R. Skudy
Attorney, Agent, or Firm—Venable, Baetjer & Howard

[57] ABSTRACT

An anisotropic magnet for a rotary electric machine having at least two magnetic pole portions in a cylindrical yoke. An anisotropic magnet constituting the magnetic pole portions is arranged such that a central portion of each magnetic pole portion has lines of magnetic force oriented in a radial direction, and opposite end portions of each magnetic pole portion located closer to respective opposite ends of the magnetic pole portion has lines of magnetic force oriented in such a manner as to be gradually offset from the radial direction toward a mutually parallel direction. Accordingly, an effective magnetic flux density of a sinusoidal waveform is generated in the magnetic pole portions. Also disclosed is an apparatus for molding an anisotropic magnet comprising: an upper die and a lower die respectively provided with a recess having an arcuate cross section; a central core whose opposite end portions are each formed into a substantially fan-shaped cross section and which allows a magnetic field to be generated; and two side cores disposed on the sides of said central core, side surfaces of opposite end portions of the side cores being formed into a substantially parallel configuration, said side cores being adapted to generate a magnetic field. Accordingly, the anisotropic magnet thus formed has lines of magnetic force oriented radially in its central portion and oriented substantially in parallel with each other at its opposite end portions.

6 Claims, 9 Drawing Sheets

ANISOTROPIC MAGNET FOR ROTARY ELECTRIC MACHINE

BACKGROUND OF THE INVENTION

FIELD OF THE INVENTION

The present invention relates to an anisotropic magnet for a rotary electric machine, an apparatus for molding the same, a magnetizing method, and a magnetizing device.

DESCRIPTION OF THE RELATED ART

Figure 11:
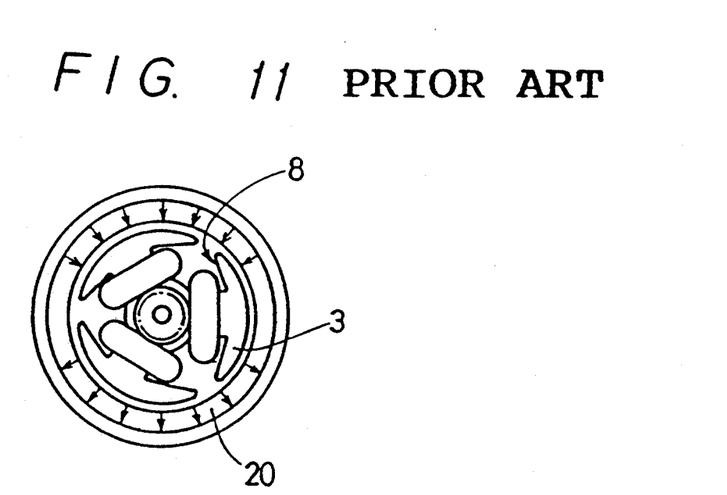
FIG. 11 is a front elevational view illustrating a dc motor incorporating a conventional radial anisotropic magnet.
Figure 12:
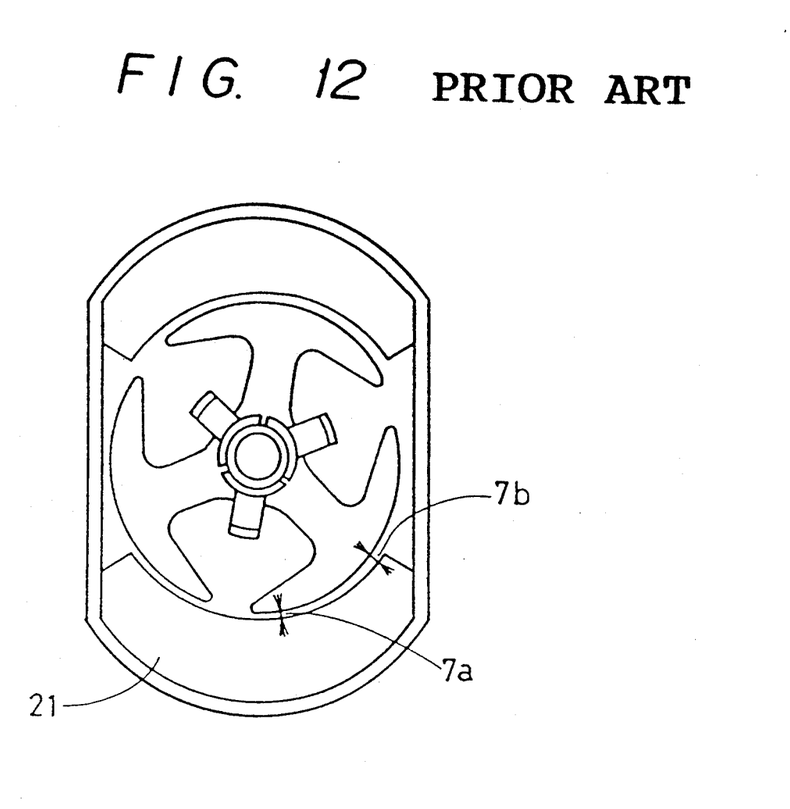
FIG. 12 is a front elevational view illustrating another dc motor incorporating conventional so-called eccentric magnets.

Conventionally, as shown in FIG. 11, a permanent magnet dc motor is provided with a radial anisotropic magnet 20 which serves as a field magnet and whose lines of magnetic force are oriented radially with respect to the center of the dc motor. In such a dc motor, cogging torque generally occurs as attraction between the radial anisotropic magnet 20 and a core 3 of a rotor 8 varies abruptly owing to variations in the angle of rotation. This cogging torque has been a factor in causing vibration of the dc motor during its operation. Accordingly, the following two methods are known as countermeasures for overcoming this drawback: (1) a method in which so-called eccentric magnets are provided wherein, as shown in FIG. 12, opposite end portions of anisotropic magnets 21 serving as field magnets are made thin so as to reduce the magnetic flux density at a gap 7b in the vicinity of each end portion of the magnet 21 relative to a gap 7a in the vicinity of a central portion thereof, thereby realizing smooth sinusoidal variations in the magnetic flux density, and (2) a method in which so-called skew magnets are provided wherein the distribution of a magnetic flux density in the axial direction of the motor is gradually offset in the rotating direction. With both of the above-described two methods, however, a decline in the maximum torque has been unavoidable since cogging torque is basically reduced by sacrificing an effective magnetic flux with respect to the torque. For this reason, in order to reduce vibrations and noise, external measures, such as providing a vibration-insulating measuring rubber for a bracket portion of the dc motor, have been adopted. Such measures, however, have led to an increase in the production cost of the dc motor and have constituted problems.

In addition, there is a recent example in which, as disclosed in Japanese Patent Application Laid-Open No. 260118/1988, magnetization is effected by using an improved magnetizing device with respect to a radial anisotropic cylindrical magnet so as to achieve sinusoidal variations in the magnetic flux density. In this case, however, a magnetizing device having a complicated structure is required, and an effective magnetic flux is sacrificed with respect to the torque. As a result, since sufficient use is not made of the essential property of the anisotropic magnet, there has been the drawback that a decline in the maximum torque is unavoidable.

SUMMARY OF THE INVENTION

Accordingly, an object of the present invention is to provide an anisotropic magnet for a rotary electric machine which is capable of reducing vibrations and noise by reducing cogging torque without increasing the production cost and without causing a reduction of an output, thereby overcoming the above-described drawback of the conventional art.

To this end, in accordance with a first aspect of the invention, there is provided, in a rotary electric machine having a plurality of magnetic pole portions in a cylindrical yoke, an anisotropic magnet constituting said magnetic pole portions, wherein a central portion of each of said magnetic pole portions has lines of magnetic force oriented in a radial direction, and opposite end portions of each of said magnetic pole portions located closer to respective opposite ends of each of said magnetic pole portions has lines of magnetic force oriented in such a manner as to be gradually offset from the radial direction toward a mutually parallel direction. Accordingly, an effective magnetic flux density of a sinusoidal waveform is generated in the magnetic pole portions. Two magnetic pole portions may be used as the plurality of magnetic pole portions.

In accordance with another aspect of the present invention, there is provided an anisotropic magnet for a rotary electric machine wherein said anisotropic magnet is compression molded in a magnetic field such that lines of magnetic force in said central portion are oriented in the radial direction, and lines of magnetic force in the vicinity of said opposite end portions closer to said ends of each of said magnetic pole portions are oriented in such a manner as to be gradually offset from the radial direction toward the mutually parallel direction, and wherein said anisotropic magnet is magnetized in directions substantially parallel with the respective directions of orientation.

By virtue of the above-described arrangement, since lines of magnetic force at opposite end portions of the each magnetic pole portion are oriented in such a manner as to be gradually offset from the radial direction toward the mutually parallel direction during compression molding of the anisotropic magnet, self demagnetization, in which the magnetic field at opposite end portions of the magnetic pole portions offset the magnetic field at the central portions thereof after magnetization, is reduced. As a result, since the effective magnetic flux density at the central portions becomes high, it is possible to readily provide an anisotropic magnet displaying an ideal sinusoidal distribution of the effective magnetic flux density.

Another object of the present invention is to provide an apparatus for molding an anisotropic magnet for use in a rotary electric machine and whose lines of magnetic force are oriented in such a manner as to be capable of reducing the cogging torque of the rotary electric machine.

To this end, in accordance with still another aspect of the invention, there is provided an apparatus for molding an anisotropic magnet comprising: an upper die serving as a first die and a lower die serving as a second die, respectively provided with a recess having an arcuate cross section; a central core serving as a first core member whose opposite end portions are each formed into a substantially fan-shaped cross section and which allows a magnetic field to be generated; and two side cores serving as second core members and disposed on the sides of the central core, side surfaces of opposite end portions of the side cores being formed into a substantially parallel configuration, the side cores being adapted to generate a magnetic field.

In accordance with the above-described arrangement, a central portion of the anisotropic magnet powders filled in spaces defined by the upper and lower dies and the cores is subjected to compression molding between recessed portions of the upper and lower dies each having the arcuate cross section on the one hand, and the corresponding opposite ends of the central core each having the substantially fan-shaped cross section on the other. At this juncture, this portion of the anisotropic magnet powders is compression molded while being subjected to a radially oriented magnetic field by means of the central core so as to be oriented in the radial direction. On the other hand, opposite end portions of the anisotropic magnet powders are compression molded while being subjected to a parallel magnetic field between the recessed portions of the upper and lower dies each having the arcuate cross section on the one hand, and opposite ends of the two side cores having their sides formed into a substantially parallel cross section on the other, so as to be oriented in the parallel direction.

Still another object of the present invention is to provide a magnetizing method capable of magnetizing an anisotropic magnet exhibiting a sinusoidal distribution of an effective magnetic flux density without requiring a magnetizing device having a complicated structure.

To this end, in accordance with a further aspect of the invention, there is provided a method of magnetization for generating an effective magnetic flux density of a sinusoidal waveform in a magnetic pole portion of an anisotropic magnet for use in a rotary electric machine, comprising the steps of: compression molding in a magnetic field an anisotropic magnet such that lines of magnetic force at a central portion of said magnetic pole portion are oriented in a radial direction, and lines of magnetic force at opposite end portions of said magnetic pole portion located closer to respective opposite ends of said magnetic pole portion are oriented in such a manner as to be gradually offset from the radial direction toward a mutually parallel direction; incorporating said anisotropic magnet into a yoke and incorporating a rotor in a center of said anisotropic magnet so as to assemble said rotary electric machine; and applying a magnetic field from an outer side of said yoke in directions substantially identical with respective directions of orientation of said lines of magnetic force, thereby magnetizing said anisotropic magnet.

In accordance with this arrangement, in a process for subjecting an anisotropic magnet formed of a raw earth element, such as cerium and neodymium, or ferrite to compression molding in a magnetic field so as to be oriented, radial orientation is imparted to a central portion of the magnetic pole portion, and parallel orientation is imparted to the opposite end portions of the magnetic pole portion. Accordingly, it is possible to obtain an anisotropic magnet having a desirable sinusoidal distribution of an effective magnetic flux density without needing to accurately control the intensity of the magnetizing magnetic field into a sinusoidal waveform in an ensuing magnetizing process. In addition, since the anisotropic magnet is magnetized in a state in which the anisotropic magnet after compression molding in a magnetic field, together with a rotor, is incorporated in the yoke of the rotary electric machine, it is possible to readily generate a desired magnetizing magnetic flux via the substantially cylindrical yoke and the substantially cylindrical core of the rotor without requiring a magnetizing device having a complicated structure. Furthermore, the operation of assembling the rotary electric machine is facilitated as compared with a case where the anisotropic magnet magnetized outside is incorporated into the yoke.

A further object of the present invention is to provide a magnetizing device having a simple structure and capable of magnetizing an anisotropic magnet exhibiting a sinusoidal distribution of an effective magnetic flux density.

To this end, in accordance with a further aspect of the invention, there is provided a device for magnetizing an anisotropic magnet for use in a rotary electric machine, comprising: superconductive-type magnetic field generating means for generating a parallel magnetic field of a high magnetic flux density by means of a superconductive magnet; a magnetizing yoke disposed in the parallel magnetic field of a high magnetic flux density generated by said superconductive magnet, the magnetizing yoke being adapted to introduce the parallel magnetic field to a material to be magnetized, such as a rare-earth magnet, which serves as the anisotropic magnet; and a controlling member for controlling a magnetic path in such a manner that the parallel magnetic field of a high magnetic flux density passes the anisotropic magnet in conformity with a predetermined waveform of magnetization, thereby imparting a predetermined waveform of magnetization to the anisotropic magnet.

With the magnetizing device constructed as described above, a parallel magnetic field of a high magnetic flux density is generated by using a superconductive magnet, and this parallel magnetic field is introduced to the anisotropic magnet by means of the magnetizing yoke. At this time, the leakage of the magnetic flux to the outside is prevented by virtue of the Meissner effect, which is one of the phenomena of superconductivity. Consequently, the parallel magnetic flux thus generated is introduced as it is to the anisotropic magnet with the state of the high magnetic flux density maintained.

The present invention is thus characterized in that the parallel magnetic field of a high magnetic flux density introduced to the anisotropic magnet in this manner is controlled by using the magnetizing core disposed in the anisotropic magnet or between the anisotropic magnets, thereby imparting a predetermined waveform of magnetization to the anisotropic magnet.

As a result, it is possible to fully magnetize the anisotropic magnet with a high magnetic flux density and attain the magnetization with an ideal magnetizing pattern. Consequently, it is possible to reduce the vibrations and noise occurring in a rotary electric machine to low levels without accompanying a reduction in its output.

In addition, even in a case where the material to be magnetized is formed into a circular-arc-shaped cross section such as a stator-side magnet of the rotary electric machine, it is possible to fully magnetize the same with a pattern close to a practically ideal sinusoidal waveform.

The magnetizing device in accordance with a further aspect of the invention comprises: a magnetizing coil for generating a magnetizing magnetic flux; a superconductive guide portion formed into a cylindrical configuration so as to allow the magnetizing coil to be disposed at its opening located at one end thereof and allow the magnetizing magnetic flux to pass the interior of the superconductive guide portion; a throttling portion disposed at another opening located at the other end of the superconductive guide portion, whereby the magnetizing magnetizing magnetic flux introduced to the superconductive guide portion is throttled by the throttling portion and is applied to a surface of a material to be magnetized, thereby magnetizing the material to be magnetized so as to be provided with a uniform high magnetic flux density.

With this magnetizing device, the magnetizing coil is disposed at an opening located at one end of the superconductive guide portion formed on a side of a cylinder, and the material to be magnetized is located at the opening provided at the other end of the guide portion.

Subsequently, if the magnetizing coil is excited by being energized to generate a magnetizing magnetic flux, this magnetic flux passes through the interior of a cylindrical portion of the superconductive guide portion.

At this juncture, the superconductive guide portion prevents the magnetic flux from leaking to the outside by virtue of the Meissner effect, which is one of the phenomena of superconductivity. Consequently, the magnetic flux generated is introduced as it is to the opening located at the other end.

Moreover, the magnetizing magnetic flux introduced by the superconductive guide portion is throttled by the throttling portion at the opening located at the other end, and is applied to the surface of the material to be magnetized in the form of the magnetic flux having a high magnetic flux density.

Accordingly, in accordance with the present invention, even in cases where the material to be magnetized is formed of a rare-earth element having a large coercive force, it is possible to reliably magnetize the same with a high magnetic flux density.

In addition, in cases where the material to be magnetized is formed into a circular-arc-shaped cross section such as a stator-side magnet of a rotary electric machine, the magnetic flux can be oriented perpendicularly to the surface of the material to be magnetized, thereby making it possible to fully magnetize the same with a practically ideal pattern.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a description will be given of the preferred embodiments of the present invention.

Figure 1:
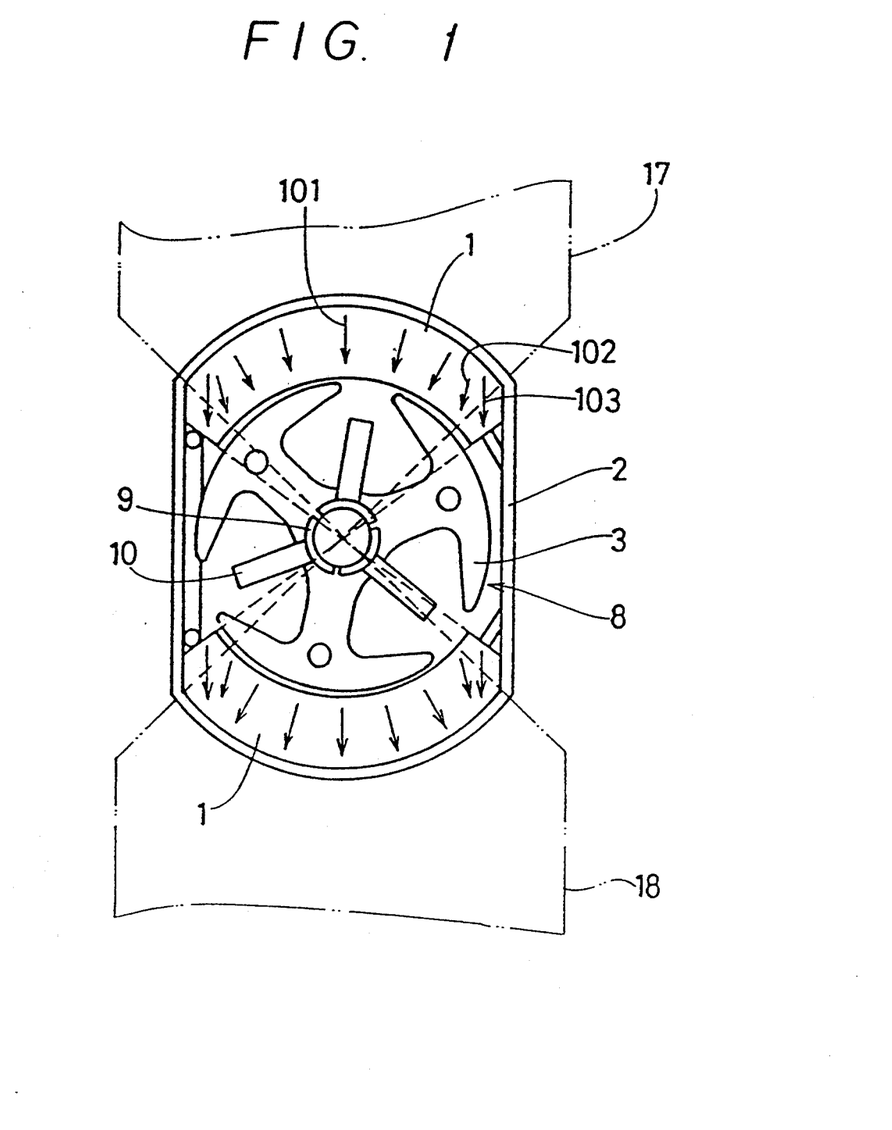
FIG. 1 is a front elevational view illustrating the orientation of lines of magnetic force of a dc motor provided with a pair of anisotropic magnets in accordance with a first embodiment of the present invention.
Figure 2:
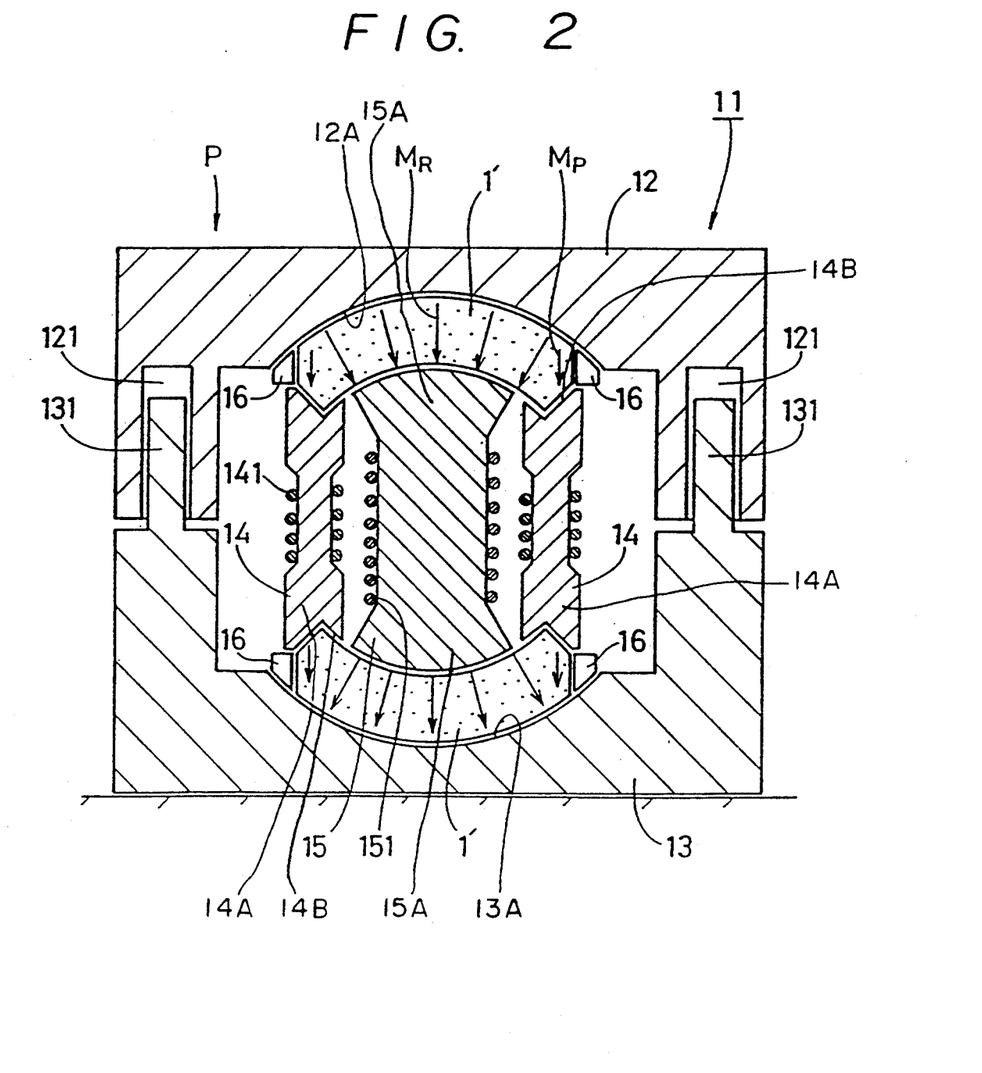
FIG. 2 is a cross-sectional view illustrating a molding apparatus for compression molding the anisotropic magnets in accordance with the first embodiment in a magnetic field.

A first embodiment of the present invention is shown in FIGS. 1 and 2. FIG. 1 is a front elevational view illustrating the directions of lines of magnetic force of a dc motor provided with a pair of anisotropic magnets in accordance with the present invention. Each of a pair of upper and lower anisotropic magnets 1 has a circular-arc-shaped cross section and is formed into a configuration of a curved tile. A yoke 2 has a substantially cylindrical shape with an ellipsoidal cross section with straight sides. In a central portion of each anisotropic magnet 1, lines of magnetic force 101 are oriented toward or away from the center of the dc motor. In opposite end portions of each anisotropic magnet 1, lines of magnetic force 102, 103 are offset from from the lines of magnetic force 101 in such a manner as to be oriented more parallel with the straight sides of the yoke 2 toward the end of each anisotropic magnet 1. Although not shown, coils are wound in a well-known configuration around a core 3 of a rotor 8 by means of a magnet wire and are connected to a commutator 9. A brush 10 is in contact with a periphery of the commutator 9.

FIG. 2 illustrates a molding apparatus for compression molding the anisotropic magnets 1 in a magnetic field. A molding apparatus 11 comprises an upper die 12, a lower die 13, a central core 15, and two side cores 14 as constituent members of a mold. It should be noted that the upper die 12 and the lower die 13 are arranged to form a magnetic circuit, so that a cavity 121 and a rod 131 for connecting the two dies are provided in the upper die 12 and the lower die 13, respectively, on each opposite side thereof. In addition, members 16 formed of a paramagnetic material are provided at portions of the mold where magnetic paths are not to be formed. A coil 151 is wound around the central core 15, while a coil 141 is formed around each of the side cores 14. Recesses 12A, 13A each having a circular-arc-shaped cross section are provided in the upper die 12 and the lower die 13, respectively. Each opposite end portion 15A of the central core 15 is formed into a substantially fan-shaped cross section. Each opposite end portion 14A of each side core 14 has its sides formed into a substantially parallel cross section and has a recess 14B with a V-shaped cross section at its tip. The recess 14b is adapted to abut against inner and side surfaces of anisotropic magnet powders 1'. When the above-described anisotropic magnets 1 are compression molded in a magnetic field by means of the molding apparatus 11, the anisotropic magnet powders 1' are first filled in spaces formed between the upper die 12 and the three cores 14, 15 and between the lower die 13 and the three cores 14, 15. The upper die 12 is then pressed downward with a pressure P, and electric current is allowed to flow across the coils 141, 151. Then, a radial magnetic field $M_R$ oriented toward or away from the center of the circular arcs is generated between the upper die 12 and the central core 15 and between the lower die 13 and the central core 15, respectively. In addition, a magnetic field $M_P$ parallel with the vertical direction is generated between the upper die 12 and each side core 14 and between the lower die 13 and each side core 14. A magnetic field at each end portion of the anisotropic magnet powders 1' becomes more parallel with the vertical direction at a position closer to the very end in such a manner as to be offset from the direction oriented toward or away from the center of the circular arcs. Thus, the characteristic of this embodiment lies in that, by dividing the core into three parts, the direction of orientation of the anisotropic magnets is not set in the radial direction only, the arrangement of which is generally well-known, but that only the end portions of the anisotropic magnets are oriented substantially parallel with the vertical direction by virtue of the side cores 14 in such a manner as to be offset from the direction oriented toward or away from the center of the circular arcs of the anisotropic magnets.

A method of magnetizing the anisotropic magnets 1 after being compression molded in a magnetic field is effected as follows: As shown in FIG. 1, after the dc motor is assembled by incorporating the anisotropic magnets 1 and the rotor 8 in the yoke 2, magnetizing poles 17, 18 of a magnetizing device are brought into contact with the outer periphery of the yoke 2, and electric current is allowed to flow across unillustrated coils wound around the magnetizing poles 17, 18, thereby effecting magnetization.

Figure 3:
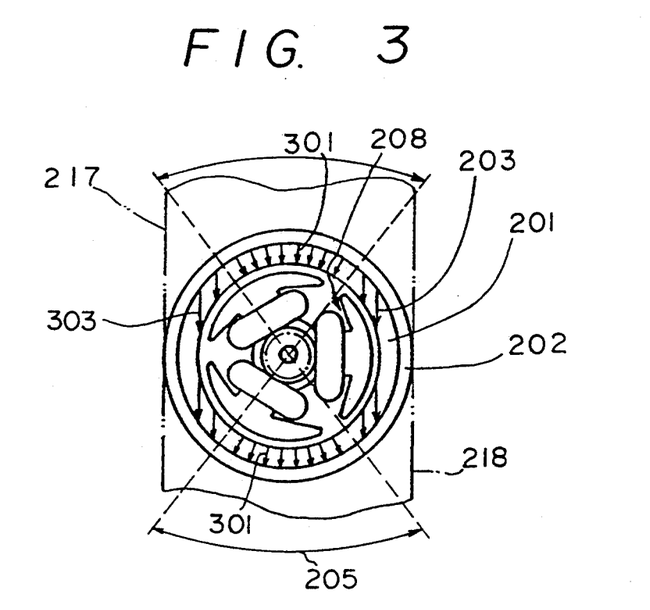
FIG. 3 is a front elevational view illustrating the orientation of lines of magnetic force of a dc motor provided with an anisotropic magnet in accordance with a second embodiment of the present invention.

Referring now to FIG. 3, a description will be given of a second embodiment of the present invention. In this embodiment, an anisotropic magnet 201 is formed into a cylindrical configuration. This anisotropic magnet 201 is compression molded in a magnetic field by a molding apparatus having a core split into three parts in the same way as the one shown in FIG. 2. As for the direction of orientation of the anisotropic magnet 201, in a central portion 205 of the anisotropic magnet 201, lines of magnetic force 301 are oriented toward or away from the center of the anisotropic magnet 201, whereas, in the remaining portions of the anisotropic magnet 201, i.e., in left- and right-hand portions of the anisotropic magnet 201 as viewed in FIG. 3, lines of magnetic force 303, 203 are oriented in such a manner as to be parallel with each other. Subsequently, after the dc motor is assembled by incorporating the anisotropic magnet 201 and a rotor 208 in a cylindrical yoke 202, as shown in FIG. 3, magnetizing poles 217, 218 are brought into contact with the yoke 202, and magnetization is effected in substantially the same direction as the direction of orientation. Once the anisotropic orientation has been determined during compression molding in a magnetic field, it is possible to obtain a desirable sinusoidal distribution of an effective magnetic flux density without needing to accurately control the direction and accuracy of magnetization.

Figure 4:
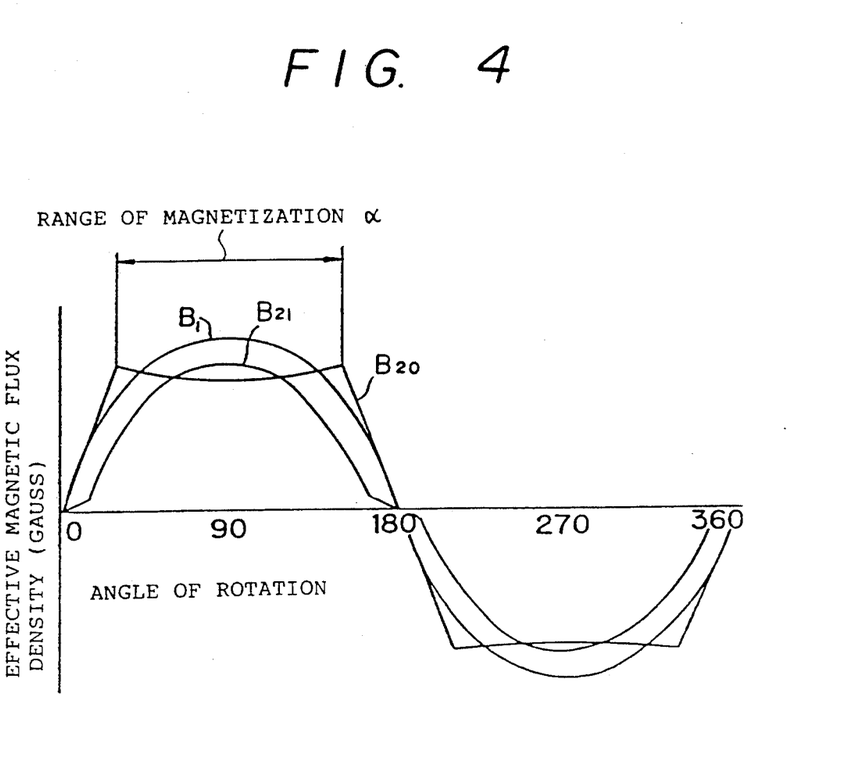
FIG. 4 is a characteristic diagram illustrating, in comparison with prior art examples, the distribution of an effective magnetic flux density with respect to an angle of rotation of a dc motor incorporating an anisotropic magnet of the present invention.
Figure 5:
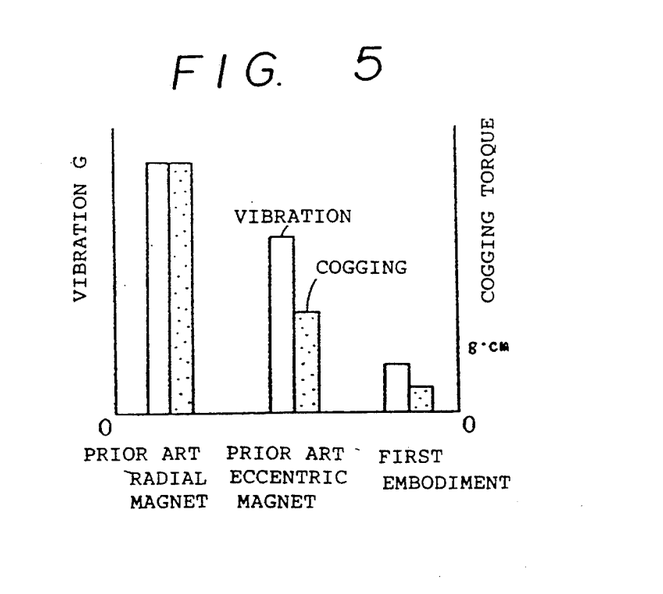
FIG. 5 is a characteristic diagram illustrating, in comparison with prior art examples, the cogging torque and vibration of the dc motor incorporating the anisotropic magnet of the present invention.

The distribution of an effective magnetic flux density of the anisotropic magnets 1 in accordance with the first embodiment of the present invention, cogging torque and vibrations are shown in FIGS. 4 and 5, respectively, in comparison with the prior art. An effective magnetic flux density of a prior art radial anisotropic magnet 20 shown in FIG. 11, that of prior art so-called eccentric magnets 21 shown in FIG. 12, and that of the anisotropic magnets 1 in accordance with the first embodiment of the present invention are respectively indicated as $B_{20}$, $B_{21}$, and $B_1$ in FIG. 4. As shown in the diagram, in the case of $B_{20}$ in accordance with the prior art, the portions where the polarity changes undergo sharp changes. Although the effective magnetic flux (area) is sufficient, large variations in the magnetic flux density are noted. The reason for this is as follows: In the case of an anisotropic magnet, even by using a relatively weak magnetizing magnetic field, it is possible to readily effect magnetization sufficiently in the direction of orientation provided during compression molding in a magnetic field, which shows that it is very difficult to control a magnetic flux density in a magnetizing magnetic field. In the case of $B_{21}$ in accordance with the prior art, the changes are smooth at the portions where the polarity changes, but the effective magnetic flux density is reduced by that portion, which shows that a decline in a maximum torque takes place. In the case of $B_1$ in accordance with the present invention, the changes in the portions where the polarity changes are smooth as compared with $B_{20}$ in accordance with the prior art. Moreover, $B_1$, as compared with $B_{20}$, shows a high effective magnetic flux density in the vicinity of angles of rotation of 90° and 270°, which shows that the total amount of magnetic flux is not reduced as compared with $B_{20}$. The reason for this is that demagnetization caused by the dimagnetic field of its own in the central portion of $B_1$, as compared with the central portion of $B_{20}$, is not canceled by the orientation of its end portions and is hence reduced, with the result that the effective magnetic flux density becomes high. Thus, in accordance with the present invention, it is possible to obtain a desired distribution of the effective magnetic flux density since the distribution of the effective magnetic flux density of the anisotropic magnet is controlled by the orientation of lines of magnetic force obtained during compression molding in a magnetic field, without depending on the intensity of the radial magnetizing magnetic flux. In terms of advantages entailed by this arrangement, when dc motors were fabricated by being provided with the same torque and the same number of revolutions, as shown in FIG. 5, in accordance with the first embodiment of the present invention as compared with the radial anisotropic magnet of the prior art, cogging torque (g.cm) could be reduced to 1/10, and the vibration (G) to 1/5.

In addition, although in the above-described embodiments the magnetizing device is constructed with coils wound around its magnetizing poles, it is apparent that the magnetizing device can be constructed by using conventionally known permanent magnets.

It should be noted that although the above-described embodiments are applied to dc motors, it goes without saying that the present invention can be applied to other rotary electric machines using an anisotropic magnet, such as generators and brushless motors.

Figure 6:
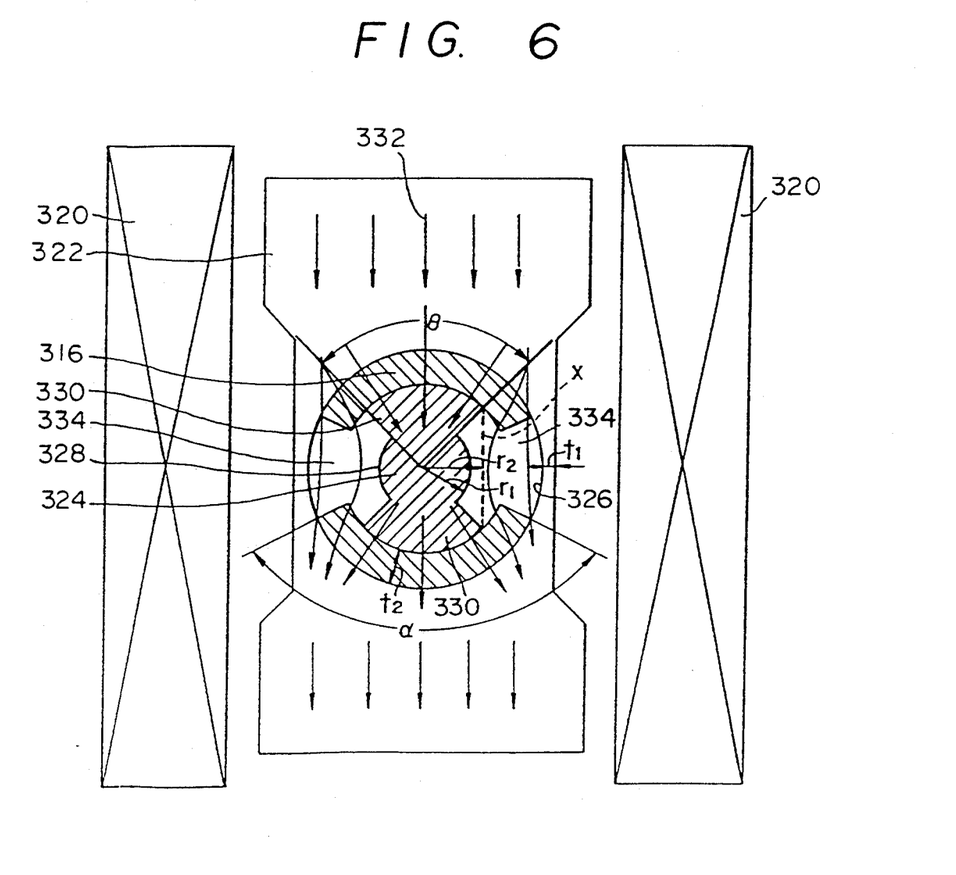
FIG. 6 is a cross-sectional view of a magnetizing device for rotary electric machines in accordance with a third embodiment of the present invention.

FIG. 6 is a diagram illustrating a magnetizing device for motors in accordance with a third embodiment of the present invention.

This magnetizing device for motors is used to magnetize anisotropic magnets 316 formed of a rare earth element including samarium, cerium, and neodymium, and comprises a pair of superconductive magnets 320, a magnetizing yoke 322, and a magnetizing core 324.

The superconductive magnets 320 generate a large magnetic flux for magnetizing the rare-earth anisotropic magnets 316 and are adapted to produce a parallel magnetic field of a high magnetic flux density.

The magnetizing yoke 322 is disposed between the aforementioned superconductive magnets 320 and is adapted to introduce the parallel magnetic field of a high magnetic flux density from the superconductive magnets 320. In addition, the magnetizing yoke 322 has in a substantially central portion thereof a holding portion 326 for holding the material to be magnetized, i.e., the anisotropic magnets, 316. This material to be magnetized has a circular-arc-shaped cross section. The holding portion 326 is formed into a cylindrical shape so as to be capable of holding two pieces of the material to be magnetized 316 in a state in which the material to be magnetized 316 is held in close contact with the holding portion 326 in upper and lower positions. Furthermore, in this embodiment, a thickness t1 of left and right-hand side portions of the holding portion 326 is set to be smaller than a thickness t2 of the material to be magnetized 316.

The magnetizing core 324 is disposed between the two pieces of the material to be magnetized 316 inside the holding portion 326. In addition, this magnetizing core 324 has a central portion 328 with a circular cross-section and two contacting portions 330 each having a substantially fan-shaped cross section and respectively projecting from upper and lower positions of this circular central portion 328. The contacting portions 330 are adapted to be brought into close contact with the material to be magnetized 316.

A range $\theta$ of the contact surface of each contacting portion 330 with respect to the material to be magnetized 316 is set to be smaller than a range $\alpha$ of magnetization of the material to be magnetized 316. In addition, as for the central portion 328 with a circular cross section, its radius r1 is set to be shorter than a distance r2 extending from the center of the central portion 328 to a line x connecting ends of the upper and lower contacting portions 330.

Furthermore, a nonmagnetic material 334 is disposed in portions of the holding portion 326 other than the magnetizing core 324.

A description will now be given of a case where the material to be magnetized 316 is magnetized by using the above-described magnetizing device for motors.

First, the two pieces of material to be magnetized 316 are disposed at the upper and lower positions inside the holding portion 326 of the magnetizing yoke 322, and the magnetizing core 324 is disposed between the two pieces of the material to be magnetized 316. In this state, the magnetizing yoke 322 is disposed between the superconductive magnets 320.

Subsequently, when the superconductive magnets 320 are excited by being energized so as to produce a magnetizing magnetic flux 332 of a high density, this magnetizing magnetic flux 332 is introduced and passes in parallel inside the superconductive magnets 320 by means of the magnetizing yoke 322.

At this juncture, the superconductive magnets 320 prevent the leakage of the magnetizing magnetic flux 332 to the outside by virtue of the Meissner effect, which is one of the phenomena of superconductivity. For this reason, the magnetizing magnetic flux 332 thus generated is introduced as it is to the material to be magnetized 316.

In addition, the magnetizing magnetic flux 332 introduced to the material to be magnetized 316 tries to pass in parallel toward an exit (lower end) side through the magnetizing core 324. However, since the range $\theta$ of the contact surface of each contacting portion 330 of the magnetizing core 324 is set to be smaller than the range $\alpha$ of magnetization of the material to be magnetized 316, and, in a central portion of each piece of the material to be magnetized 316 against which the magnetizing core 324 abuts, since the opposite ends of each contacting portion 330 of the magnetizing core 324 are oriented toward the center of the magnetizing core 324 in the form of a sector, the magnetizing magnetic flux 332 introduced in parallel to the material to be magnetized 316 is throttled at a predetermined angle and passes in a radial direction.

On the other hand, at each opposite end portion of the material to be magnetized 316, since the magnetizing core 324 does not abut against it, and by virtue of the presence of the nonmagnetic material 334, the magnetizing magnetic flux 332 in the vicinity of the nonmagnetic material 334, although attracted slightly by the magnetizing core 324, does not advance strictly in the radial direction. The magnetizing magnetic flux 332 close to the end of the material is offset away from the radial direction, and the magnetizing magnetic flux 332 located more closely to the very end is attracted by the magnetizing yoke 322 and advances substantially in parallel with the sides of the magnetizing yoke 322.

In this case, since the thickness t1 of left- and right-hand side portions of the holding portion 326 is set to be smaller than the thickness t2 of the material to be magnetized 316, the magnetizing magnetic flux 332 is prevented from flowing in large quantities to the left- and right-hand side portions of the holding portion 326. Accordingly, it is possible to prevent the magnetizing magnetic flux 332 from flowing in large quantities in the opposite end portions of the material to be magnetized 316 away from the radial direction.

In addition, as for the central portion 328 of the magnetizing core 324, its radius r1 is set to be shorter than the distance r2 extending from the center of the central portion 328 to the line x connecting ends of the upper and lower contacting portions 330. It is possible to prevent the magnetizing magnetic flux 332 passing through the opposite end portions of the material to be magnetized 316 from flowing radially by being attracted by the magnetizing core 324 more than is necessary.

Thus, in accordance with the present invention, even in a case where the material to be magnetized 316 has a circular-arc-shaped cross section as in the case of a stator-side magnet of a motor, it is possible to fully magnetize the same with a virtually ideal pattern. Accordingly, the magnetized magnet exhibits an ideal sinusoidal magnetization pattern, as shown at B1 of FIG. 4.

Where the rare-earth anisotropic magnets 316 thus formed are incorporated in a dc motor similar to that of FIG. 1 which shows the first embodiment, the anisotropic magnets 1 in FIG. 1 correspond to the rare-earth anisotropic magnets 316 of this embodiment.

Figure 7:
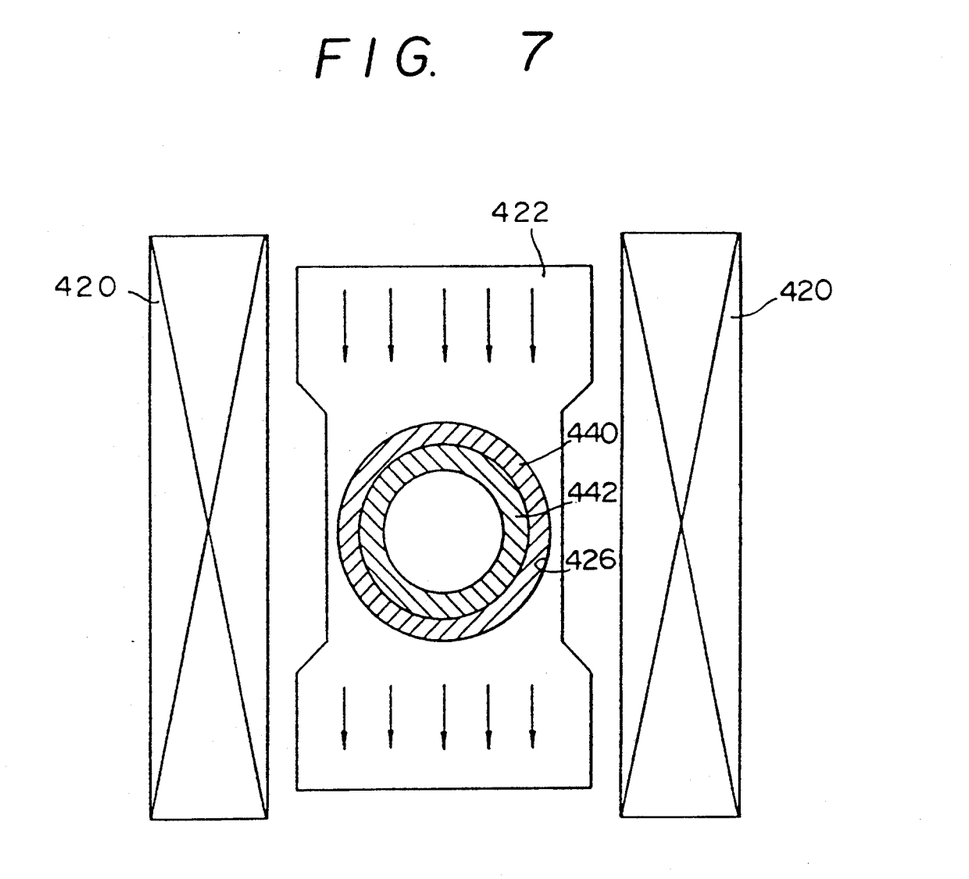
FIG. 7 is a cross-sectional view of a magnetizing device for rotary electric machines in accordance with a fourth embodiment of the present invention.

FIG. 7 illustrates a fourth embodiment of the present invention.

In this embodiment, a tubular material to be magnetized, i.e., an anisotropic magnet, 440 is disposed in a holding portion 426 of a magnetizing yoke 422 arranged between superconductive magnets 420. A cylindrical magnetizing core 442 abutting against an inner surface of the material to be magnetized 440 is disposed in the material to be magnetized 440.

Where the magnet 440 thus formed is incorporated in a motor similar to that of FIG. 3 showing the second embodiment, the anisotropic magnet 201 in FIG. 3 corresponds to the magnet 440 of this embodiment.

It should be noted that the present invention is not restricted to the above-described embodiments, and various modifications are possible within the scope of the gist of the present invention.

For instance, in the above-described third and fourth embodiments, a description has been given of the case where magnetization is effected by using two kinds of magnetizing cores 324, 442. However, the present invention is not restricted to these examples, and magnetization under various conditions can be effected by modifying the configuration of the magnetizing core.

In addition, although an integrated type is used as the magnetizing yoke 422, a split-configuration type may be adopted, and it is possible to reduce the thickness t1 of the left- and right-hand side portions of the holding portion 426 to nil.

Furthermore, although in the third and fourth embodiments a description has been given of cases where the magnetizing yoke 322, 422 is located between the superconductive magnet 320, 420, the present invention is not restricted to the same. Namely, the magnetizing yoke 322, 422 may be disposed at any position insofar as it is located in a parallel magnetic field produced by the superconductive magnets 320, 420. For instance, in a case in which the parallel magnetic field produced by the superconductive magnets 420 is introduced by using a cylindrical superconductive guide portion, the magnetizing yoke 422 may be disposed in the superconductive guide portion.

A detailed description will now be given of a fifth embodiment of the present invention by citing the case of magnetizing a stator-side magnet of a motor by way of example.

Figure 8:
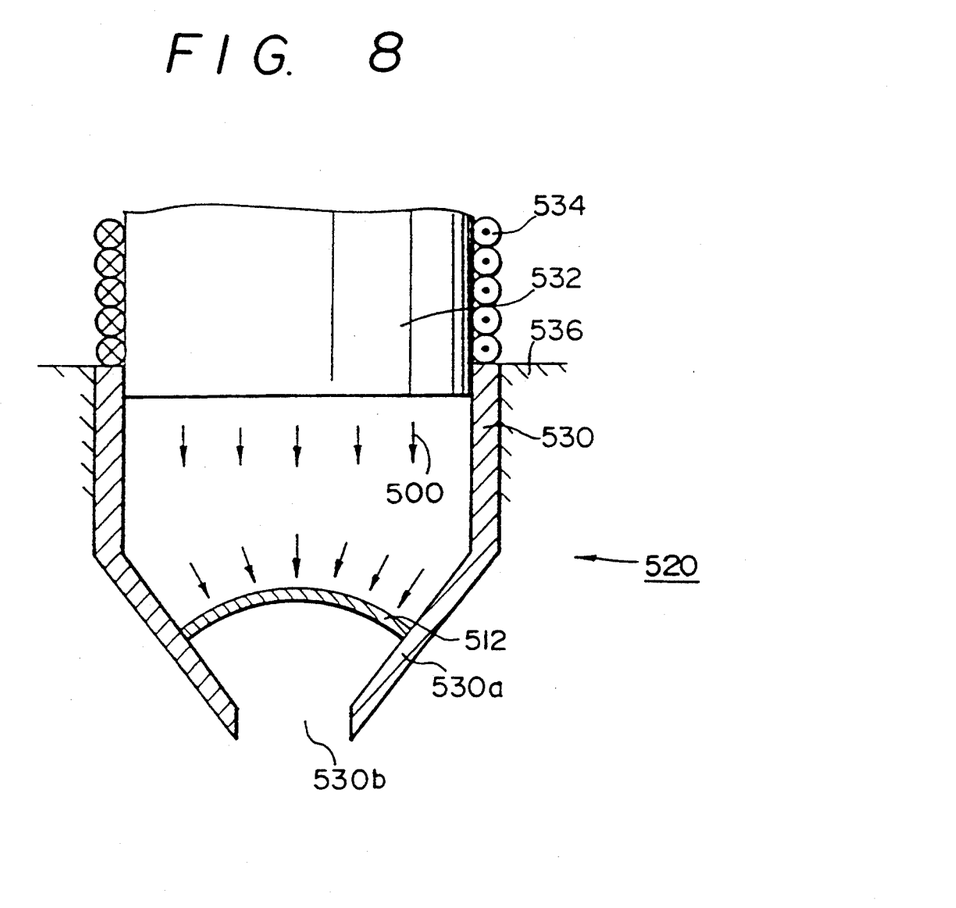
FIG. 8 is a cross-sectional view schematically illustrating an example of a magnetizing device in accordance with a fifth embodiment of the present invention.

FIG. 8 illustrates an example of a magnetizing device 520 in accordance with the fifth embodiment. The magnetizing device of this embodiment is formed so as to magnetize a rare-earth magnet 512 which is disposed on the stator of the motor.

This magnetizing device comprises a superconductive guide portion 530 formed into a cylindrical shape, a core 532 fixed in an opening provided at one end of the guide portion 530 in such a manner as to closely contact an inner peripheral surface thereof, and a magnetizing coil 534 wound around an outer periphery of the core 532.

The ampare-turn of the magnetizing coil 534 is set in such a manner as to produce a large magnetic flux 500 for magnetization.

The superconductive guide portion 530 has its peripheral portion cooled by a coolant 536 such as liquefied nitrogen and is formed in such a manner as to maintain a good superconductive state.

In addition, a throttling portion 530a is formed at an opening 530b provided at the other end of the superconductive guide portion 530 so as to throttle the magnetic flux 500 so as to obtain a high magnetic flux density.

By adopting the above-described arrangement, if the magnetizing coil 534 is excited by being energized to produce the magnetizing magnetic flux 500, the magnetic flux 500 flows through the interior of the cylindrical superconductive guide portion 530.

At this juncture, the superconductive guide portion 530 prevents the leakage of the magnetic flux 500 to the outside by virtue of the Meissner effect, which is one of the phenomena of superconductivity. For this reason, the magnetizing magnetic flux 500 thus generated is introduced as it is to the opening 530b at the other end of the superconductive guide portion 530.

Moreover, the magnetizing magnetic flux 500 introduced by the superconductive guide portion 530 is throttled by the throttling portion 530a located at the opening 530b, and is applied to the surface of the rare-earth magnet 512 with a high magnetic flux density.

Accordingly, in accordance with the present invention, it is possible to reliably magnetize the rare-earth magnet 512 having a large coercive force, so as to be provided with a high magnetic flux density.

In addition, the magnetizing device of this embodiment is arranged such that the throttling portion 530a of the superconductive guide portion 530 is throttled in the radial direction in correspondence with the curvature of the surface of the magnet 512.

Figure 10:
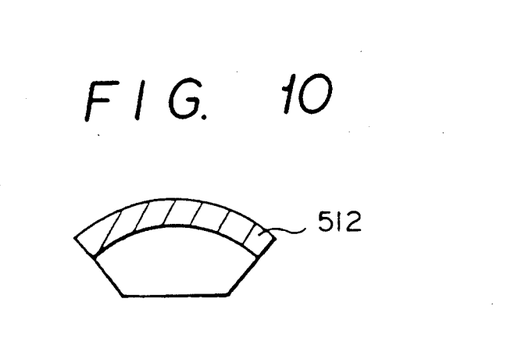
FIG. 10 is a diagram illustrating a magnetizing pattern obtained when magnetization is effected by using the magnetizing device in accordance with the present invention.
Figure 13:
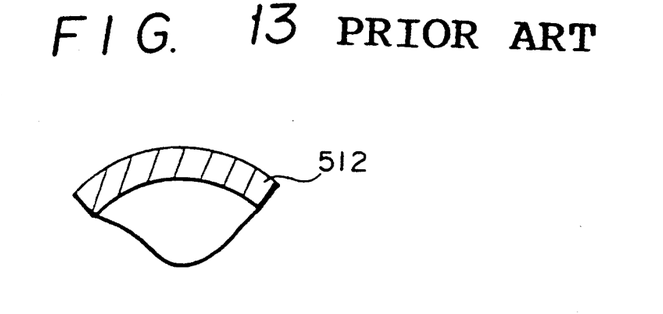
FIG. 13 is a diagram illustrating a magnetizing pattern obtained when magnetization is effected by using a magnetizing device according to the prior art.

As a result, the magnetic flux 500 throttled by the throttling portion 530a is oriented perpendicularly to the surface of the magnet 512. FIG. 10 illustrates a pattern close to an ideal one. Accordingly, the magnet 512 can be fully magnetized with this pattern close to the ideal one. It should be noted that, in contrast, FIG. 13 illustrates a magnetization pattern in a case where magnetization is effected by using a conventional magnetizing device, and magnetization is shown to have been effected with a nonuniform pattern in which a peak is present in its center.

Although in the foregoing embodiment a description has been given by citing an example in which the rare-earth magnet 512 is disposed inside the opening 530b provided at the other end of the superconductive guide portion 530, the present invention is not restricted to the same, and full magnetization can also be effected if the magnet 512 is disposed outside the opening 530b.

Figure 9:
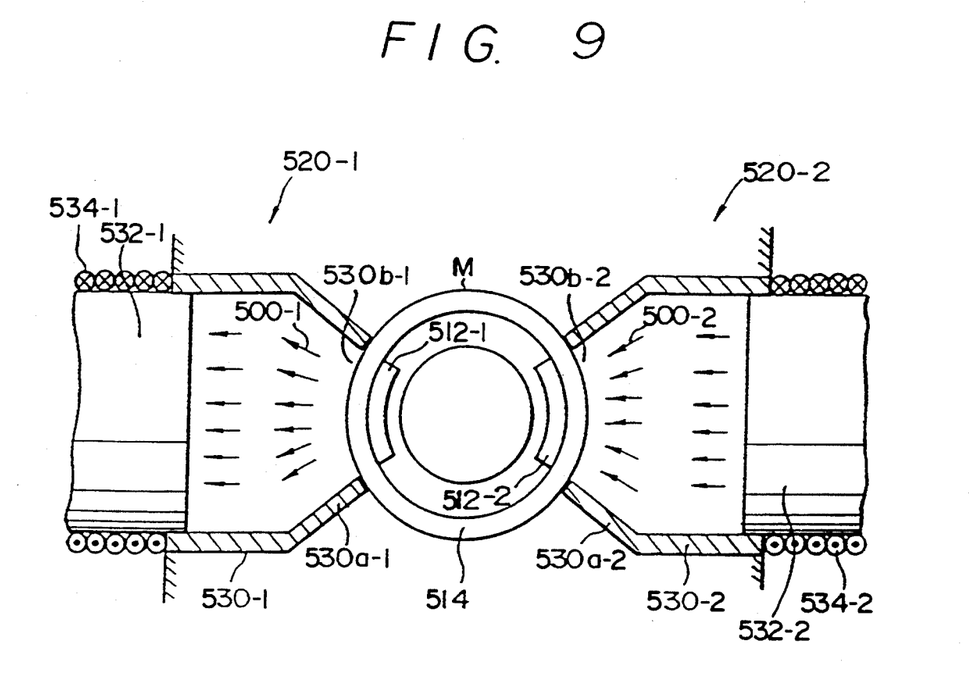
FIG. 9 is a diagram illustrating a sixth embodiment of the present invention.

FIG. 9 illustrates a sixth embodiment of the present invention.

Although in the fifth embodiment of the magnet 512 is effected separate from a stator of a rotary electric machine, in the sixth embodiment the magnets 512-1, 512-2 are fully magnetized with the magnets 512-1, 512-2 fixed to the stator of a rotary electric machine M.

In this case, a pair of magnetizing devices 520-1, 520-2 whose directions of a magnetic flux 500-1, 500-2 are oriented in different directions are prepared. Then, the openings 530b-1, 530b-2 of the magnetizing devices 520-1, 520-2 are opposed to magnets 512-1, 512-2 via a yoke 514. In this state, the magnetizing coils 534-1, 534-2 of the magnetizing devices 520-1, 520-2 are excited by being energized.

As a result, the rare-earth magnets 512-1, 512-2 fixed to the yoke 514 are magnetized with a high magnetic flux density and with an ideal pattern, so that it is possible to obtain a motor having excellent characteristics. In addition, even if the remaining portions of the motor are magnetized at this juncture, its coercive force is so small that substantially no influence is exerted on the characteristics of the rotary electric machine.

It should be noted that the present invention is not restricted to the foregoing embodiments, and various modifications are possible within the scope of the gist of the present invention.

For instance, although in the fifth and sixth embodiments a description has been given by citing an example in which the stator-side magnet 512 (512-1, 512-2) of the rotary electric machine is magnetized, the present invention is not restricted to the same and may be used in magnetizing various materials to be magnetized, as necessary.

In accordance with the fifth and sixth embodiments, an advantage is offered in that it is possible to obtain a magnetizing device capable of reliably effecting and fully magnetizing with a high magnetic flux density a material to be magnetized which requires a strong magnetic flux for magnetization, particularly rare-earth magnets.

In particular, in accordance with the fifth and sixth embodiments, even in cases where the material to be magnetized is formed with a predetermined curvature, it is possible to orient the magnetic flux in correspondence with the curvature of its surface. Hence, a material to be magnetized having such a predetermined curvature can be fully magnetized with an ideal pattern. Thus, the present invention is quite suitable for cases where stator-side rare-earth magnets that are mounted on motors and generators are fully magnetized.

As described above, the rotary electric machine in accordance with the present invention is characterized by the following: An anisotropic magnet is first compression molded in a magnetic field such that lines of magnetic force in a central portion of each opposite magnetic pole portion are oriented radially, while lines of magnetic force at opposite end portions of each of the magnetic pole portions are oriented such as to be gradually offset from the radial direction toward a mutually parallel direction. Then, the anisotropic magnet is magnetized in directions substantially the same as those of orientation of the anisotropic magnet thus molded, thereby allowing an effective magnetic flux density of a sinusoidal waveform to be produced at each magnetic pole portion. Accordingly, the rotary electric machine offers outstanding advantages in that it displays a desirable sinusoidal distribution of an effective magnetic flux density, in that cogging torque and vibrations can be reduced appreciably without increasing the production cost and reducing an output. In addition, since the magnetic flux density does not change abruptly, there are outstanding advantages in that rectification can be improved when the invention is applied to a rotary electric machine such as a motor, electrical noise produced from electrical parts such as a rectifier can be reduced, electric sparks are made difficult to issue, and the life can be prolonged.

In addition, the molding apparatus in accordance with the present invention comprises upper and lower dies each provided with a recess having an arcuate cross section, a central core having opposite end portions each formed into a substantially fan-shaped cross section and arranged to allow a magnetic field to be produced, and two side cores disposed on both sides of the central core and each having opposite ends formed into a substantially parallel configuration and arranged to allow a magnetic field to be produced. Accordingly, the molding apparatus has an outstanding advantage in that it can favorably mold an anisotropic magnet oriented in such a manner as to be capable of reducing the cogging torque of a rotary electric machine.

Furthermore, as described above, the magnetizing method in accordance with the present invention comprises the steps of: compression molding in a magnetic field an anisotropic magnet such that lines of magnetic force at a central portion of said magnetic pole portion are oriented in a radial direction, and lines of magnetic force at opposite end portions of said magnetic pole portion located closer to respective opposite ends of said magnetic pole portion are oriented in such a manner as to be gradually offset from the radial direction toward a mutually parallel direction; incorporating said anisotropic magnet into a yoke and incorporating a rotor in a center of said anisotropic magnet so as to assemble said rotary electric machine; and applying a magnetic field from an outer side of said yoke in directions substantially identical with respective directions of orientation of said lines of magnetic force, thereby magnetizing said anisotropic magnet. Accordingly, the magnetizing method has an outstanding advantage in that an anisotropic magnet exhibiting a sinusoidal distribution of an effective magnetic flux density can be magnetized favorably without requiring a magnetizing device having a complicated structure. In addition, the operation of assembling a rotary electric machine can be facilitated as compared with a case where an anisotropic magnet magnetized outside is incorporated into a yoke.

What is claimed is:

1. An anisotropic magnet for use in a rotary machine having a plurality of magnetic pole portions in a yoke wherein said anisotropic magnet establishes at least one of said magnetic pole portions, said anisotropic magnet having a center portion with lines of magnetic force oriented in a radial direction and opposite portions each having lines of magnetic force that are successively oriented in such a manner as to be gradually offset from a radial direction toward a direction wherein outermost lines of magnetic force of the opposite portions are mutually parallel.

2. An anisotropic magnetic according to claim 1, wherein said yoke is substantially cylindrical.

3. An anisotropic magnet according to claim 1, wherein said anisotropic magnet has a substantially circular-arc-shaped cross section.

4. An anisotropic magnet according to claim 1, wherein said anisotropic magnet is comprised of an annular member which has a substantially cylindrical cross section and establishes said plurality of magnet pole portions at opposite portions of said annular member.

5. An anisotropic magnet according to claim 1, wherein said anisotropic magnetic is compressedly molded in a magnetic field such that lines of magnetic force in said center portion are oriented in the radial direction and lines of magnetic force in the vicinity of said opposite portions are successively oriented in such a manner as to be gradually offset from the radial direction toward the mutually parallel direction, and wherein said anisotropic magnetic is magnetized in directions substantially parallel with respective said lines of magnetic force in said center portion and said lines of magnetic force in the vicinity of said opposite portions.

6. An anisotropic magnet according to claim 1, wherein two magnetic pole portions are provided in said yoke.

* * * * *